United States Patent Office 2,743,295
Patented Apr. 24, 1956

2,743,295

PRODUCTION OF FORMIC ACID FROM ITS SALTS

Herbert Klapproth, Oestrich, Rheingau, Germany, assignor to Rudolph Koepp & Co. Chemische Fabrik Aktiengesellschaft, Oestrich, Rheingau, Germany, a corporation of Germany No Drawing. Application March 17, 1952,
Serial No. 277,075

Claims priority, application Germany March 21, 1951

4 Claims. (Cl. 260—542)

This invention relates to the production of low molecular weight carboxylic acids, which may be substituted, namely monocarboxylic acids such as formic acid, acetic acid, propionic acid, glycollic acid or chloracetic acid, and dicarboxylic acids, such as oxalic acid and tartaric acid, from their alkali salts including their ammonium salts.

In the hitherto known processes for the production of carboxylic acids from their alkali salts, whether of continous or discontinuous nature, the solid crystallised carboxylic acid salts always serve as the starting material for the reaction with mineral acid. For example, the process for the preparation of formic acid was carried out as follows:

The aqueous formate solution produced by the formate synthesis, after purification from undesired contaminants, was evaporated in vacuo until it crystallised, the solid salt was separated by centrifuging from the mother liquor and the residual water was removed by vigorous drying in suitable drying apparatus. It was just this last operation which required a disproportionately large expenditure of energy, since the formates retain the last trace of water very obstinately because of their great hygroscopicity. The anhydrous formate thus obtained was ground fine, suspended in as concentrated as possible formic acid, concentrated sulphuric acid was added and the formic acid produced was distilled off continuously or discontinuously in a suitable apparatus. The salt of sulphuric acid remaining as the distillation residue in the apparatus was then removed in the dry state or else dissolved out by addition of water. The use of solid formate as the starting material for the production of formic acid entails various disadvantages, both of a chemical and a mechanical nature. The disadvantages are of a chemical nature insofar as decomposition phenomena cannot completely be avoided during the reaction of solid formates with concentrated sulphuric acid and necessarily lead to losses of formic acid. The mechanical disadvantages are due to the fact that working with solid substances—whether these are introduced into the reaction or are produced during the reaction—necessitates a large consumption of power to ensure thorough mixing and moreover makes high demands on the mechanical and chemical resistance to abrasion of the stirring mechanism, the packing material and the like, which these can only meet with difficulty and sometimes incompletely.

The invention relates to the production of carboxylic acids from the mixtures in which they are formed by extraction with suitable solvents. According to the invention the difficulties entailed by working in different phases are overcome by carrying out the reaction of the carboxylic acid salts with mineral acid or acid salts of mineral acids in a single phase, namely in aqueous solution, and by extracting the carboxylic acid produced from the mixtures in which it is produced by means of a suitable solvent. The carboxylic acid is then separated from the solvent in known manner by fractional distillation.

For the extraction of the carboxylic acids all solvents are suitable which readily dissolve the carboxylic acids and, so far as they are volatile, do not form azeotropic mixtures with the carboxylic acids and have a boiling point substantially different from that of the carboxylic acid. If these solvents are insoluble or only sparingly soluble in water, they can be used alone. In cases where the extraction media have too great a power of dissolving water or the aqueous carboxylic acid, they can be mixed with another solvent which itself is completely insoluble in water or aqueous carboxylic acid and largely suppresses the power of the extraction medium to dissolve water or aqueous carboxylic acid.

Good extraction media include inter alia the carboxylic acid esters of monohydric and polyhydric alcohols, whilst it is preferable to use the esters of the same acid as that which is to be extracted. The following are examples of such esters: ethyl, isopropyl and isoamyl esters and the esters of glycols. These esters can be partially etherified, like methyl-, ethyl- and butyl-glycol formate or methoxybutanol formate. Ethers form a further group of suitable extraction media. Aliphatic ethers, such as diethyl ether and di-isopropyl ether, can be employed, or else cyclic ethers, preferably glycol ethers. Tetrahydrofurane and its methyl derivatives, such as alpha-methyl-tetrahydrofurane, have proved particularly suitable extraction media. Finally, ketones, such as ethylmethyl ketone or cyclohexanone, and tertiary alcohols, such as tertiary amyl alcohol or pinacone, can be used as extraction media.

Of course, several of these extraction media can be used together, for example formic acid can be extracted with isopropyl formate and tetrahydrofurane from the mixture in which it is formed from sodium formate and sulphuric acid.

If the extraction media have too great a power of dissolving water or aqueous carboxylic acids, this power must be reduced when monocarboxylic acids are being extracted. For example, cyclohexanone, ethylmethyl ketone and tetrahydrofurane dissolve water as well as formic acid too readily to extract anhydrous formic acid from the reaction solution. If, for example, in these cases mono- or dichlorbenzene is added to cyclohexanone, carbon tetrachloride or benzene is added to ethylmethyl ketone, or isopropyl formate, benzene or an aliphatic hydrocarbon is added to tetrahydrofurane, then the extraction gives formic acid of high concentration.

In order to avoid losses of extraction media, the residues thereof in the aqueous reaction solution freed from carboxylic acid are driven out by heating or extracted with a further solvent which is completely water-immiscible. The solvents are then separated by fractional distillation.

In order to concentrate volatile organic acids such as formic acid, acetic acid and their homologues, it is known to extract them from their aqueous solutions by means of suitable solvents. The water is then driven off azeotropically from the acid extracts so obtained, which still contain much water, and the carboxylic acid is separated from the solvent by fractional distillation.

Apart from the fact that in the present new process the volatile organic acid is not extracted as hitherto from a simple aqueous solution but is extracted directly from the mixture in which it is formed, the new process has also the advantage that the solubility of the carboxylic acid and also of the extraction medium in the aqueous phase is substantially reduced by the simultaneous presence of a reaction product having a salting out effect, namely the alkali sulphate. The above-described effect can be recognised particularly clearly from the fact that in the new process it is possible to use, for the extraction of the carboxylic acids, solvents which cannot be used because of their great water-solubility for an extraction from a purely aqueous phase, since in that case a separation into two phases no longer takes place. This increases considerably the number of extraction media suitable for use in the extraction of the carboxylic acids; above all, this number includes a series of solvents, such, for example, as the cyclic glycol ethers and certain ketones, which possess a particularly favourable distribution factor for the low molecular weight carboxylic acids.

The salting out effect of the mineral acid salt produced by the reaction between the carboxylic acid salt and the mineral acid can be considerably further increased by reacting the aqueous solution of the carboxylic acid salts, not with mineral acids, but with acid salts of mineral acids. For example, sodium formate can be reacted with sodium bisulphate or acid sodium phosphate instead of with concentrated sulphuric acid.

When the invention is applied to the recovery of formic acid from the mixtures in which it is formed, the concentration of alkali sulphate in the aqueous solution of the mixture formed from alkali formate and alkali bisulphate is increased by one equivalent, which produces a further displacement of the distribution of formic acid between solvent and aqueous phase in favour of the solvent when the formic acid is subsequently extracted. Thus, for example, the distribution factor for formic acid between tetrahydrofurane and the aqueous solution of the mixture formed from sodium formate and sulphuric acid (2 NaOOC.H+H₂SO₄) is 2.0 and the distribution factor between tetrahydrofurane and the aqueous solution of the mixture formed from sodium formate and sodium bisulphate (NaOOC.H+NaHSO₄) is 3.3. This marked improvement in the distribution ratio in the case of an extraction of the low molecular weight carboxylic acid from the aqueous solution of the mixture in which it is formed of the above-described kind offers two substantial advantages when the process of the invention is carried out on a technical scale. First, considerably less solvent is required for extracting the carboxylic acid, which simultaneously reduces the amount of energy required to evaporate the solvent. Second, the extracted aqueous acid has an appreciably higher concentration, since less water is extracted with it.

A particular technical advance made by the process of the invention over the present state of the art is that it is not necessary to isolate the solid carboxylic acid salt but the aqueous solution of the carboxylic acid salt can be reacted directly with sulphuric acid. For example in the production of formic acid, it is not necessary to isolate the sodium formate but the aqueous sodium formate solution produced by the usual formate synthesis can be reacted directly with sulphuric acid or sodium bisulphate. The formic acid can then be removed by extraction from the reaction solution thus obtained, containing formic acid and sodium sulphate, whilst the remaining sodium sulphate solution is returned again to the formate synthesis.

When working with mixtures of an extraction medium and a non-solvent, for example aliphatic or aromatic hydrocarbons or their chlorine derivatives, the power of the actual extraction medium to dissolve water is reduced, but simultaneously its power to dissolve the carboxylic acid is also reduced. If so much of the non-solvent auxiliary liquid is added that the extraction medium no longer has the power to take up water at all, the distribution factor for the carboxylic acid is also so greatly reduced that very large quantities of solvent are required to remove it without residue from the reaction solution.

According to a particularly advantageous embodiment of the invention, the process is carried out in two stages, in that in a first stage less of the auxiliary liquid which does not dissolve water is added than would be necessary to make the extraction medium completely hydrophobic, and thereby carboxylic acids are obtained which still contain relatively large quantities of water, the remainder of the water being then separated from the carboxylic acids in manner known per se by azeotropic distillation with a suitable solvent. The concentration of the carboxylic acid obtained by the extraction depends within certain limits on the quantity of non-solvent added. For example, a solvent mixture can be made up in such a way that the concentration of the extracted acid lies between 60 and 70% after driving off the solvent mixture. n-Propyl formate or isobutyl formate are suitable, for example, for dehydrating the acid thus obtained. It is advantageous to distil the highly concentrated formic acid thus obtained to purify it completely.

When the process of the invention is applied to dicarboxylic acids, it is advantageous, in order to increase the economy of the extraction, to increase the concentration of alkali salts and dicarboxylic acid in the solution to be extracted, which can be achieved by raising the temperature. In certain cases this makes it necessary to carry out the extraction under pressure.

In order to carry out the new process economically, it has proved advantageous to use more than the theoretical quantity of mineral acid for the reaction with the alkali salts of the dicarboxylic acids. This increases the solubility of the alkali salts, which are generally only sparingly soluble in water, leads to a higher concentration of free dicarboxylic acid in the reaction solution which is to be extracted and consequently brings about a more favourable distribution of the dicarboxylic acid between the solvent and the aqueous phase.

This excess of mineral acid must only be used once, since it remains in the dilute aqueous solution freed from dicarboxylic acid leaving the extraction stage and can be added in this solution again to a new batch which now contains equivalent quantities of alkali salt and mineral acid. When, for example, the starting material is the sodium salt of a dicarboxylic acid, so much sulphuric acid is added to this to liberate the dicarboxylic acid that a pure sodium bisulphate solution is withdrawn as a dilute aqueous solution from the extraction stage. A new batch of starting material containing equivalent quantities of the sodium salt of the dicarboxylic acid and sulphuric acid is then dissolved in this solution and the dicarboxylic acid is again extracted. The dilute aqueous solution leaving the extraction stage then contains besides sodium bisulphate also neutral sodium sulphate, which is recovered from the sodium bisulphate solution by evaporation and crystallisation before the sodium sulphate solution is recycled.

The solvents mentioned above are also suitable for the extraction of dicarboxylic acids. Preferably extraction media are employed which either boil below 100° C. or, if they do not, can be driven off from the aqueous dicarboxylic acid solution by steam distillation. If this is also not the case, the first solvent must be re-extracted from the aqueous dicarboxylic acid solution by means of a second solvent in which the dicarboxylic acid is completely insoluble. The hydrocarbons and their halogen derivatives are such complete non-solvents for dicarboxylic acids. The two solvents are separated in conventional manner by fractional distillation.

In order to work up the solvent extract containing the dicarboxylic acid, this extract is fractionated either continuously or discontinuously in a short column in such a way that the pure solvent passes over from the head of the column whilst the concentrated aqueous solution of the dicarboxylic acid remains in the sump and flows off from thence into crystallising pans. The dicarboxylic acid, after it has crystallised out, is separated in conventional manner by centrifuging from the adherent mother liquor and the latter is returned to the extraction stage. Yields of more than 90% of the theoretical quantity of dicarboxylic acid in pure form are obtained.

The process is particularly suitable for the production of dicarboxylic acids which occur as alkali salts, such as oxalic acid or tartaric acid.

Acids of this kind have hitherto been produced as follows:

The alkali salt is first treated with milk of lime and the calcium salt thus precipitated is separated by filtration and meticulous washing from the simultaneously formed alkali hydroxide solution. The calcium salt of the dicarboxylic acid thus freed from alkali is made into a paste with the mother liquor from a previous crude acid crystallisation and is decomposed with dilute sulphuric acid. Besides free dicarboxylic acid, calcium sulphate is also produced and is separated by filtration and thrown away after meticulous washing. The acid solution which has been filtered off and the combined wash waters are evaporated in vacuo, and after sufficient concentration the acid is crystallised out. The acid thus obtained, still containing small proportions of calcium sulphate and other impurities, is purified by a further recrystallisation.

The process of the invention enables the dicarboxylic acid to be separated from accompanying inorganic impurities in a simpler way than hitherto. Moreover, for example in the case of oxalic acid, there is the advantage that the extracted dicarboxylic acid, after the solvent has been distilled off, is present in such a high concentration that it can be crystallised out by cooling without further evaporation of water.

A particular advantage of the new process as compared to the known state of the art is the substantially smaller quantity of heat which it requires. Whereas in the course of the production of the dicarboxylic acid or its alkali salts by the previous process large quantities of wash liquor must be evaporated at two stages, namely after washing out the calcium salt of the dicarboxylic acid and after washing out the calcium sulphate formed by the reaction of the calcium salt of the dicarboxylic acid with sulphuric acid, this is not necessary in the new process since there are no finely crystalline slimy precipitates to be washed, such as are formed by the calcium salts of dicarboxylic acids and of sulphuric acid.

The heat required in the new process is limited to the heat required to heat up the reaction components to dissolve them, the heat required to evaporate the extraction medium, which is about one-fifth of that required to evaporate an aqueous solution of dicarboxylic acid of the same concentration, and finally the heat required to evaporate the sodium sulphate-containing sodium bisulphate solution leaving the extraction stage to a concentration at which the sodium sulphate crystallises out whilst the sodium bisulphate still remains in solution. In cases where the sodium bisulphate solution produced can be used in the operation in another stage for further reactions, it is possible to save the heat required for evaporating the sodium bisulphate solution. The mineral acid medium, which is advantageous for a rapid extraction of the dicarboxylic acid, is then made up by addition of excess sulphuric acid in place of the circulating sodium bisulphate.

The following examples show how the process of the invention may be carried into effect:

*Example 1*

A 19% sodium formate solution is reacted with good stirring and cooling with concentrated sulphuric acid. 14 parts of sulphuric acid are used to 100 parts of formate solution.

The reaction solution thus obtained, containing 11.4% of formic acid, 17.4% of sodium sulphate and 0.5% of sodium formate, is then subjected at 30 to 35° C. to an eight-stage countercurrent extraction with a mixture of solvents. 100 parts by volume of the mixture of solvents are employed to 100 parts by volume of the reaction solution. The mixture of solvents consists of 60 parts of tetrahydrofurane and 40 parts of isopropyl formate.

The aqueous solution flowing away from the extraction stage still contains 0.4% of formic acid besides 21.9% of sodium sulphate and 0.7% of sodium formate and is returned to the formate synthesis stage.

The extract containing the formic acid is worked up by distillation in a fractionating column; the mixture of solvents boiling at 62 to 63° C. is withdrawn from the head of the column whilst formic acid of approximately 60% strength remains behind in the sump.

In order to concentrate this 60% formic acid, 3 parts of it and 1 part of n-propyl formate are introduced into the still of a further fractionating column. Soon after heating begins the azeotropic mixture consisting of 13 parts of n-propyl formate and 1 part of water (B. P. 71 to 72° C.) passes over from the head of the column. The water is separated in a separator and the ester is continuously returned to the column. The dehydration of the formic acid is complete when water no longer separates. This point can also be recognised by the fact that the boiling point rises to 81° C., namely the boiling point of pure n-propyl formate. The whole of the n-propyl formate is now driven off and the highly concentrated acid is re-distilled to purify it completely. The concentration of the formic acid obtained is 98.5%.

*Example 2*

The starting solution of Example 1 is reacted with sulphuric acid under the same conditions as in Example 1 and extracted with the same volume of a mixture of solvents consisting of 70 parts of tetrahydrofurane and 30 parts of benzene. The aqueous solution flowing away from the extraction stage has the same composition as in Example 1. The formic acid containing extract, which contains 60% of formic acid calculated on the simultaneously extracted water, is likewise worked up by fractional distillation, whereupon an azeotropic mixture of the mixture of solvents and water (B. P. 65 to 66° C.) first passes over, and then after the mixture has been impoverished in benzene tetrahydrofurance containing small amounts of water passes over at 63° C. Because a part of the water has already been driven off azeotropically with the mixture of solvents, the concentration of the solvent-free formic acid remaining behind in the sump rises to 73%. This acid is concentrated as in Example 1 with n-propyl formate.

*Example 3*

A 16.7% sodium formate solution is reacted with good stirring and cooling with the equivalent quantity of sodium bisulphate. The reaction solution thus obtained, containing 8.7% of formic acid and 27.0% of sodium sulphate, is subjected at 35 to 40° C. to an eight-stage countercurrent extraction with 0.6 part by volume of a mixture of solvents consisting of 85 parts of tetrahydrofurane and 15 parts of benzene. The aqueous solution flowing away from the extraction stage still contains 0.6% of formic acid besides sodium sulphate and is returned to the formate synthesis stage.

The extract containing formic acid is worked up by fractional distillation, whereupon an azeotropic mixture (Boiling Point 65 to 66° C.) of the mixture of solvents and water first passes over, and then after the mixture has been impoverished in benzene tetrahydrofurane containing a little water passes over at 63° C. Because a part of the water has already been driven off azeotropically with the mixture of solvents, the concentration of the formic acid remaining behind rises from 60.2% to 63.7%. This acid is concentrated by azeotropic distillation with n-propyl formate.

What I claim is:

1. In a process for the production of formic acid from its alkali salts, which comprises reacting an aqueous solution of the formic acid salt with an acid medium selected from the group consisting of mineral acids and acid salts of mineral acids, extracting the free formic acid from the reaction mixture thus obtained with a solvent mixture which readily dissolves the formic acid, has a boiling point differing from that of formic acid and does not form an azeotropic mixture with formic acid, said solvent mixture containing an extraction medium for formic acid which is soluble in water and a completely water immiscible auxiliary liquid, the steps which comprise adjusting the quantity of such auxiliary liquid that a 60 to 70% aqueous solution of formic acid is extracted by the solvent mixture, fractionally distilling the extraction product to separate the aqueous formic acid from the solvent mixture and subjecting the aqueous formic acid to azeotropic distillation to separate the formic acid from the accompanying water.

2. Process according to claim 1, wherein hydrocarbons are used as the solvents which reduce the power of the readily-soluble extraction media to dissolve in water.

3. Process according to claim 1, wherein halogen derivatives of hydrocarbons are used as the solvents which reduce the power of the readily-soluble extraction media to dissolve in water.

4. A process according to claim 1, in which a circulating solution of an acid alkali metal salt of a mineral acid is employed as the acid medium and the neutral alkali metal salt formed during the reaction is recovered by evaporation and crystallization from the solution of the acid alkali metal salt before the latter is returned to the cycle.

References Cited in the file of this patent
UNITED STATES PATENTS

| | | |
|---|---|---|
| 1,917,660 | Martin et al. | July 11, 1933 |
| 1,930,146 | Othner | Oct. 10, 1933 |
| 2,107,527 | Evans et al. | Feb. 8, 1938 |
| 2,114,825 | Wentworth | Apr. 19, 1938 |
| 2,156,345 | Martin | May 2, 1938 |
| 2,165,438 | Allquist | July 11, 1939 |
| 2,436,804 | Hill | Mar. 2, 1948 |
| 2,437,519 | Guinot et al. | Mar. 9, 1948 |
| 2,629,746 | Cox | Feb. 24, 1953 |